US008128045B2

(12) United States Patent
Skaggs

(10) Patent No.: US 8,128,045 B2
(45) Date of Patent: Mar. 6, 2012

(54) BEVERAGE HOLDER DEVICE

(76) Inventor: Doyle Skaggs, Blytheville, AR (US)

( * ) Notice: Subject to any disclaimer, the term of this patent is extended or adjusted under 35 U.S.C. 154(b) by 126 days.

(21) Appl. No.: 12/266,432

(22) Filed: Nov. 6, 2008

(65) Prior Publication Data

US 2009/0127420 A1 May 21, 2009

Related U.S. Application Data

(60) Provisional application No. 60/985,880, filed on Nov. 6, 2007.

(51) Int. Cl.
*A47K 1/08* (2006.01)

(52) U.S. Cl. .................. 248/311.2; 248/315; 248/316.1; 248/230.1; 224/545; 206/139

(58) Field of Classification Search ............... 248/311.2, 248/312.1, 313, 314, 315, 316.1, 230.1, 309.1, 248/316.6, 226.1; 224/539, 545, 553, 555, 224/558; 206/139

See application file for complete search history.

(56) References Cited

U.S. PATENT DOCUMENTS

| | | | | |
|---|---|---|---|---|
| 1,688,765 | A * | 10/1928 | Veras | 248/103 |
| 3,664,621 | A * | 5/1972 | Savoie, Jr. | 248/74.1 |
| 3,842,981 | A * | 10/1974 | Lambert | 211/74 |
| 4,877,164 | A * | 10/1989 | Baucom | 224/544 |
| 5,086,958 | A * | 2/1992 | Nagy | 224/544 |
| 5,996,957 | A * | 12/1999 | Kurtz | 248/311.2 |
| 6,601,813 | B1 * | 8/2003 | Kager et al. | 248/314 |
| 2008/0061195 | A1 * | 3/2008 | Carnevali | 248/125.8 |

* cited by examiner

*Primary Examiner* — Tan Le

(74) *Attorney, Agent, or Firm* — Hani Z. Sayed; Rutan & Tucker, LLP

(57) ABSTRACT

An improved beverage holding device that may be utilized by an individual on a recreational vehicle is provided. The improved beverage holding device may have a plurality of beverage holders whereby the beverage holders may be adaptable to hold a plurality of different sized beverage containers. Moreover, the improved beverage holder may be removably attached to the handlebars and/or external portion of a recreational vehicle to hold the beverages during use of the recreational vehicle. The device may utilize a plurality of mounting brackets that attach to a recreational vehicle and have an adjustable stem on the bracket to allow for movement of the entire assembly about the mounting bracket.

12 Claims, 6 Drawing Sheets

100
102
112
102b
102a
114
110
120
126
124
104
114
122
114
130
128
106
132
134
128
114

102b
102
102a
142
144
100
120
104

152
154
106
150
122
140

202a
202b
200
202
212
250
220

254
204
252
222
256
206

FIG. 2B
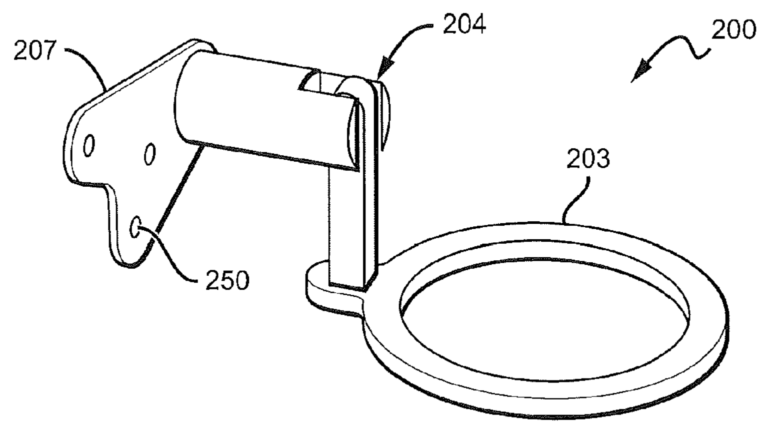
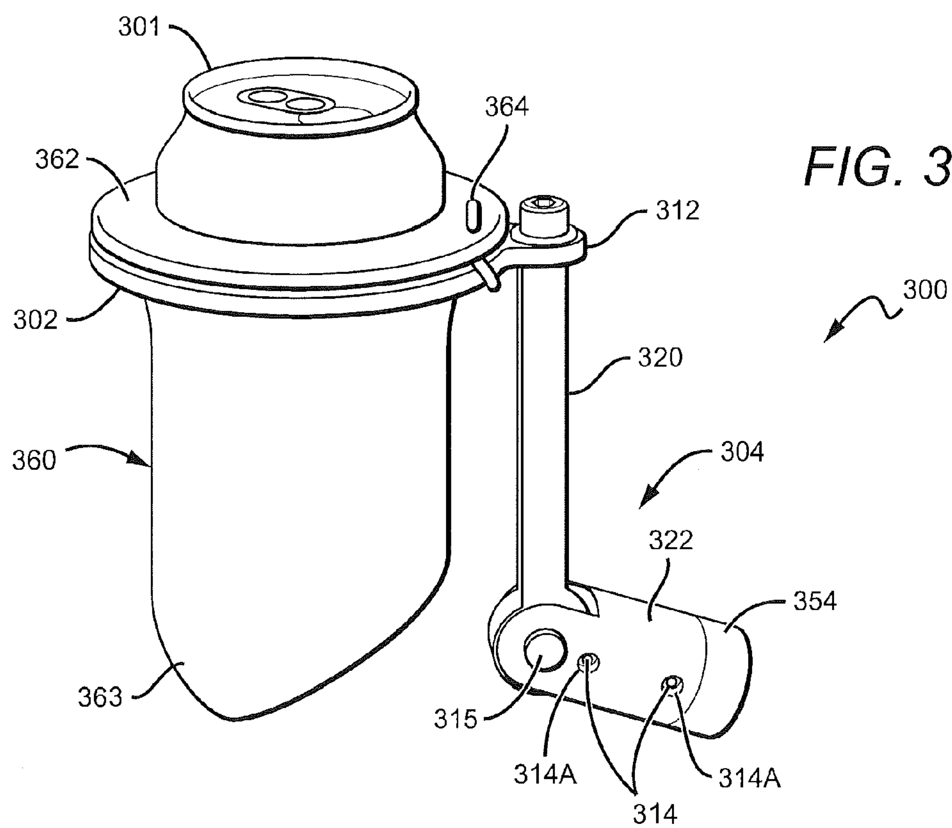
FIG. 3

400
420
406
408
422
404
412
414
416
418
410
402

401
426
406
416
408
422
405
419
402

500
508
516
504
518
510
508
514
506
502
512
508

600
606
626
628
624
618
610
616
612
602
604
614
621
620
622

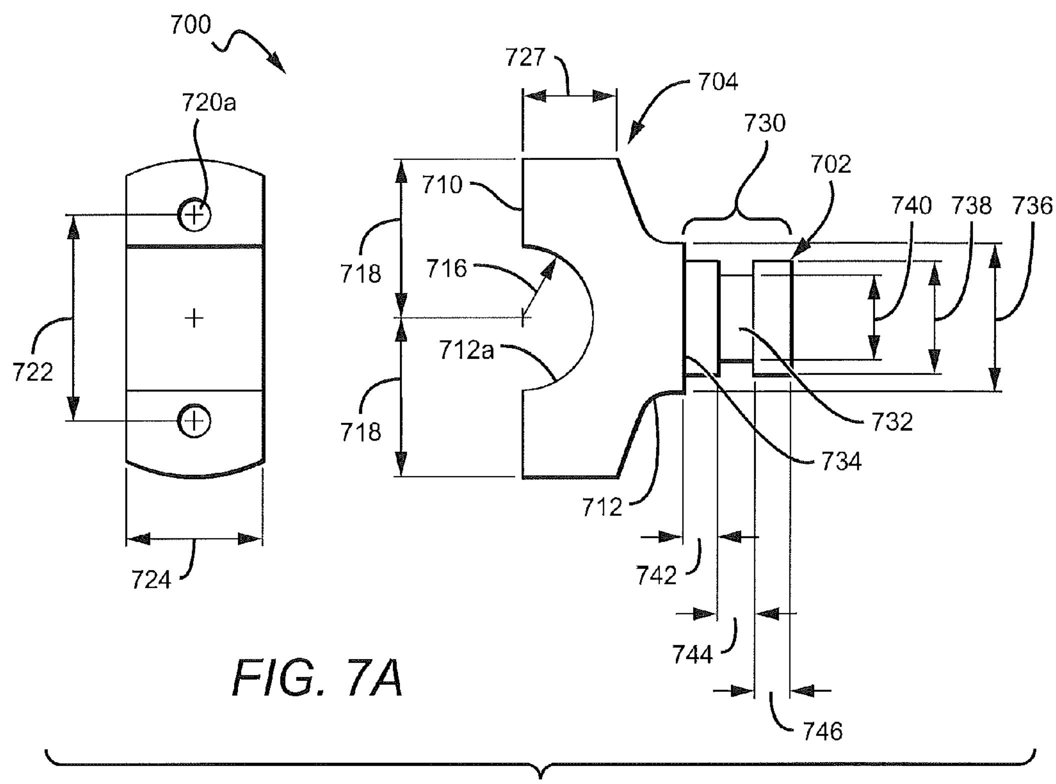
FIG. 7A
FIG. 7B
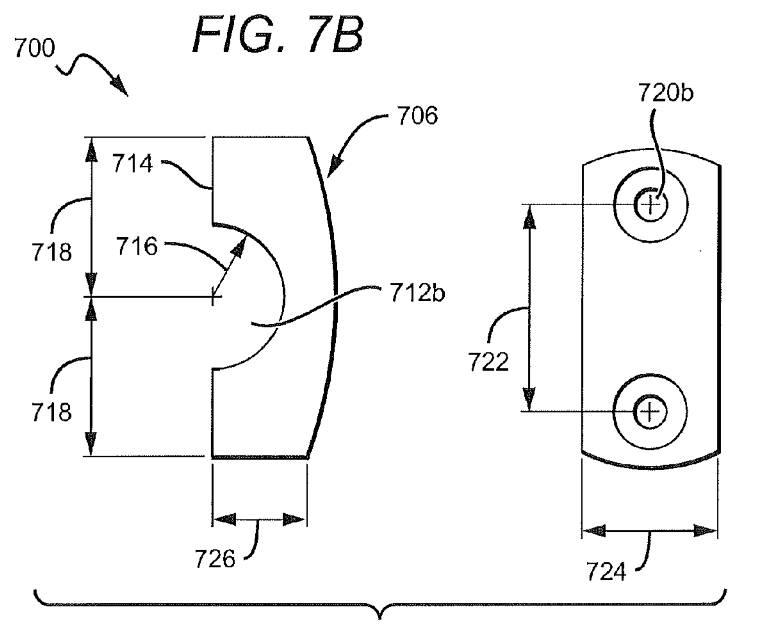

BEVERAGE HOLDER DEVICE

CROSS REFERENCE TO RELATED APPLICATIONS

This application claims priority from U.S. Provisional Patent Application No. 60/985,880 filed Nov. 6, 2007, which is hereby incorporated herein by reference in its entirety.

FIELD OF THE INVENTION

The field of the invention is for a device to hold a liquid container while in transit. More specifically, the field of the invention is for an adaptable beverage holding device that may be utilized on a motorcycle or other moving vehicle.

BACKGROUND

Many outdoor enthusiasts love to ride vehicles that allow them to feel the outside elements. These vehicles come in many forms of recreational vehicles including ATVs, dirt bikes, motorcycles, mopeds, scooters, and the like. Additionally, many road riding individuals enjoy the rush of open air that most conventional enclosed vehicles, such as cars, do not offer. Cars, trucks, and other vehicles shield the individual from the outside elements and offer an impersonal feel of the road.

Today, many people take motorcycles for road use because of the rush of the wind against them and for the feeling of being more connected with the road. Additionally, motorcycling, and other recreational vehicles allow the owner and/or operator to go places that conventional enclosed vehicles just cannot venture; while, some recreational vehicles can be a source of relaxation and rejuvenation for its users.

One of the larger problems with the use of recreational equipment is the transport of goods. Even further, one such problem is the transport of liquids. Because solids can be strapped to some portion of the vehicle, many different embodiments are used to transport these solids. However, with liquids, transportation is much more complex.

For example, if an individual is riding a motorcycle and decides to stop at a restaurant to eat, they must eat in the restaurant. If the individual does not finish some solid portion of their meal, it may be packed and transported. However, if the individual does not finish some liquid portion of the meal, typically, this liquid must be thrown away prior to departing on the vehicle. The reason for this is simply that no good means exists for transporting liquid on such a vehicle. Many larger recreational vehicles may have a fixed cup holder thereon, but only allow for a singular use. Additionally, the cup holder is usually affixed to the vehicle and is not adaptable for removal or placement at a different location on the vehicle.

Therefore, a need exists for an improved beverage holding device that may be easily placed on a recreational vehicle whereby the device may hold at least one beverage. Additionally, a need exists for an improved beverage holding device whereby the device may be removably attached to a recreational vehicle and may be adapted for use with a plurality of different sized liquid containers. Moreover, a need exists for an improved beverage holding device whereby the device may be adapted to fit on the handles of a recreational vehicle and may utilize a bracket to fit a plurality of liquid container sizes and whereby it may be adapted for use with a plurality of different recreational vehicles.

SUMMARY OF THE INVENTION

The present invention provides an improved liquid container holding device that may be utilized by an individual on a recreational vehicle. Additionally, the present invention may provide an improved beverage holding device having at least one beverage holder whereby the beverage holder may be adaptable to hold a plurality of different sized liquid containers. Moreover, the present invention provides an improved beverage holder that may be removably attached to the handlebars and/or external portion of a recreational vehicle to hold the beverages during use of the recreational vehicle. The device may utilize a plurality of mounting brackets that couple to a recreational vehicle and have an adjustable stem on the bracket to allow for movement of the entire assembly about the mounting bracket.

To this end, in an exemplary embodiment of the present invention, an apparatus for use on a recreational vehicle, the apparatus comprising: at least one rim having a generally cylindrical shape to accommodate a beverage container; an adjustable stem connected to the at least one rim; and a mounting bracket coupled to the adjustable stem and adapted to fit about the handlebars of a recreational vehicle.

In an exemplary embodiment, the apparatus for use on a recreational vehicle wherein said at least one rim being able to accommodate a plurality of different beverage containers.

In an exemplary embodiment, an apparatus for use on a recreational vehicle wherein said at least one rim being able to accommodate different sized and shaped beverage containers.

In an exemplary embodiment, an apparatus for use on a recreational vehicle wherein the mounting bracket is adapted to fit a plurality of different diameter handlebars.

In an exemplary embodiment, an apparatus for use on a recreational vehicle wherein the adjustable stem may allow for rotation and angling of the at least one rim.

In an exemplary embodiment, an apparatus for use on a recreational vehicle is comprising of an insert supported by the at least one rim, whereby the insert may accommodate different sized beverage containers.

In an exemplary embodiment, an apparatus for use on a recreational vehicle wherein the adjustable stem includes an extension portion to extend at least one rim away from an outside edge of the recreational vehicle such that the apparatus does not interfere with proper operation of the recreational vehicle.

In an exemplary embodiment, an apparatus for use on a recreational vehicle wherein a plurality of rims are provided to support a plurality of beverage containers.

In an exemplary embodiment, an apparatus for use on a recreational vehicle further comprising at least one rim having a beverage container support portion and a flange.

In an exemplary embodiment, an apparatus for use on a recreational vehicle wherein at least one rim is rotatable about the longitudinal axis of the adjustable stem.

In an exemplary embodiment, an apparatus for use on a recreational vehicle further comprising an adjustable stem having an arm portion and an extension portion.

In an exemplary embodiment, the method of comprising: an arm portion of the adjustable stem that is coupled to the at least one rim.

In an exemplary embodiment, an apparatus for use on a recreational vehicle comprising an extension portion of the adjustable stem that couples to the mounting bracket and further wherein the extension portion has a clamp section which couples to an arm portion of the adjustable stem.

In an exemplary embodiment, the method of comprising: an extension portion of the adjustable stem whereby the extension portion allows for extension of the adjustable stem from the mounting bracket thereby further removing the rim and the accompanying beverage counter away from the mounting bracket and handlebars.

Still another exemplary embodiment of the present invention is a method of using a beverage holder apparatus, the method comprising the steps of: providing at least one rim to accommodate a beverage container; connecting an adjustable stem to the at least one rim; and attaching a mounting bracket to at least a portion of a recreational vehicle, whereby the mounting bracket is further attached to the adjustable stem of the apparatus.

In an exemplary embodiment, the method further comprising the step of: providing an adjustable stem having an arm portion and an extension portion whereby the arm portion connects to the at least one rim and further wherein the extension portion connects to both the arm portion and the mounting bracket.

In an exemplary embodiment, the method further comprising the step of: allowing for extension of the extension arm away from the mounting bracket thereby removing the associated at least one rim a distance from the mounting bracket and the at least a portion of a recreational vehicle.

In an exemplary embodiment, the method further comprising the step of: allowing for rotation of the at least one rim about the adjustable stem.

In an exemplary embodiment, the method of providing for configuration of a plurality of rims about the adjustable stem whereby the plurality of rims may accommodate a plurality of differently shaped and sized beverage containers.

In an exemplary embodiment, the method further comprising the step of allowing for removal of the mounting bracket from the at least a portion of a recreational vehicle and placement on a subsequent recreational vehicle. Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

FIG. 2B illustrates and exemplary embodiment of the beverage holder, including a single rim, adjustable stem, and a mounting bracket according to alternate embodiments of the invention.

FIG. 3 illustrate an exemplary embodiment of the beverage holder utilizing an insert to accommodate various configurations, including various sizes and shapes, of different beverage containers.

FIG. 7 illustrates an exemplary embodiment of a mounting bracket, including an integrally formed hub, configured to couple to the handlebars of a vehicle, which may be utilized with other exemplary embodiments of the present invention.

DETAILED DESCRIPTION

In the following description of preferred embodiments, reference is made to the accompanying drawings, which form a part hereof, and in which it is shown by way of illustration specific embodiments in which the invention can be practiced. It is to be understood that other embodiments can be used and structural changes can be made without departing from the scope of the embodiments of this invention.

Although embodiments of the invention may be described and illustrated herein in terms of a beverage holder, it should be understood that embodiments of this invention are not so limited, but are additionally applicable to liquid containers in general. Furthermore, although embodiments of the invention may be described and illustrated herein as applying to motorcycles, it should be understood that embodiments of the invention are also applicable to other recreational vehicles, such as ATVs, scooters, mopeds, dirt bikes, bicycles, and the like. Finally, although many features of the invention are described separately or in combination, they may be used in any described embodiment. It is contemplated that the plurality of options available through the various embodiments described below may be utilized in conjunction with one another. Therefore, various features that are described in the multiple embodiments may be utilized in other embodiments, and alternatively, may not be necessary to the described embodiment.

Figure 1A:
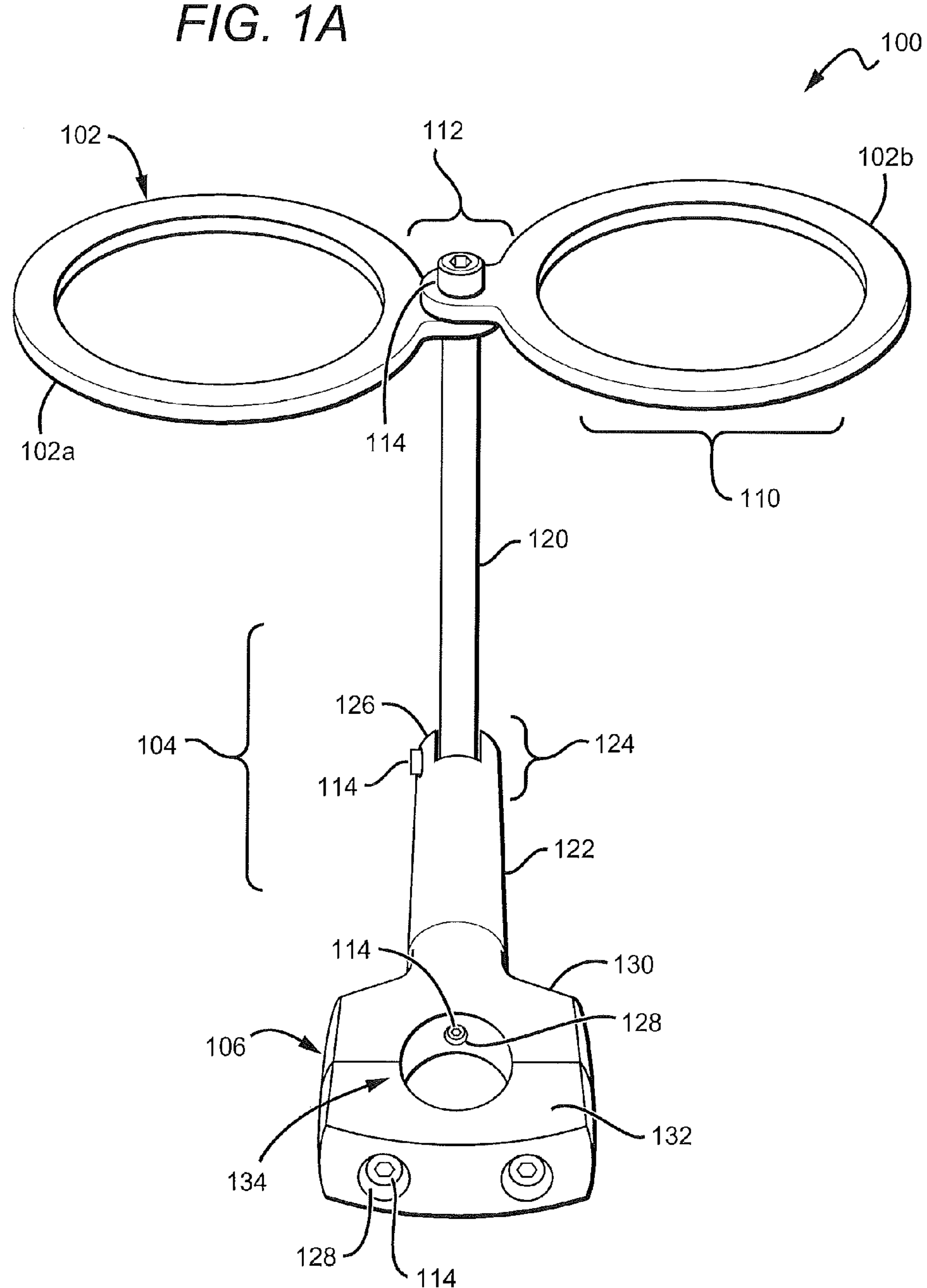
FIG. 1A illustrates an exemplary embodiment of a beverage holder including at least one rim, an adjustable stem, and a mounting bracket.

FIG. 1A illustrates an exemplary embodiment of the beverage holder 100 including at least one rim 102, an adjustable stem 104, and a mounting bracket 106. In an exemplary embodiment, the beverage holder 100 may include a first rim 102*a* and a second rim 102*b* to support multiple beverage containers (not shown). The beverage holder 100 may additionally be configured to mount to the handlebars of a recreational vehicle (not shown) by mounting bracket 106.

The at least one rim 102 may be made of a plurality of sections, including a beverage container support 110 and a flange 112. The beverage container support 110 may be generally cylindrical to support a change in profile of a beverage container (not shown) or a sleeve (see, for example, FIG. 3) to support a plurality of beverage container sizes and shapes. The at least one rim 102 may also include a flange 112 integrally formed on the outside edge of the beverage container support 110 section. The flange 112 provides a flat plane to couple the at least one rim 102 to the rest of the beverage holder 100, and preferably to the adjustable stem 104. The flange 112 may be a generally semi-circular protrusion in the same plane as the beverage container support 110. The at least one rim 102 may couple to the adjustable stem 104 by a screw 114. The flange 112 may include a hole, while one end of the adjustable stem 104 includes a threaded screw hole (not shown).

In an exemplary embodiment, the at least one rim 102 may be generally cylindrical shaped to accommodate a beverage container. The beverage holder 100 may include a first rim 102*a* and a second rim 102*b*. The first rim 102*a* and the second rim 102*b* may be rotated independently about the longitudinal axis of the screw 114. Therefore, the first rim 102*a* and the second rim 102*b* may be positioned at any position about the adjustable stem 104 relative to each other. For example, the first rim 102*a* may be positioned directly over the second rim 102*b* so that the beverage holder 100 only supports a single beverage container. Another configuration includes the first rim 102*a* positioned over the second rim 102*b* but offset so that the beverage holder 100 may accommodate various diameter beverage containers. Alternatively, the first rim 102*a* and the second rim 102*b* may be positioned generally opposite each other to accommodate multiple beverage containers (not shown). The beverage holder 100 may alternatively include more rims (not shown) to further accommodate different or multiple beverage containers.

In an exemplary embodiment, the beverage holder 100 may include an adjustable stem 104 coupled to the at least one rim 102 to permit rotation and angling of the at least one rim 102. In an exemplary embodiment, the adjustable stem 104 may include two sections, an arm 120 and an extension portion 122. The arm 120 may be coupled to the at least one rim 102 and to the extension portion 122, while the extension portion 122 couples to the mounting bracket 106. The extension portion 122 may include a clamp section 124, which couples to the arm 120. The clamp portion 124 include two projections 126 that fit around one end of the arm 120. A screw 114 may be used to couple the clamp section 124 to the arm 120. A screw 114 may be run through a hole of one of the projections 126, through a hole in the arm 120, and then threaded through the second projection 126. Thereby, the clamp section 124 may be compressed to securely hold the arm 120 in a desired position between the head of the screw 114 and the threaded side of the projection 126. This design permits the arm 120 to rotate about an axis perpendicular to the longitudinal axis of both the arm 120 and the extension portion 122. The extension portion 122 may couple to the mounting bracket 106 in a similar fashion. Alternatively, the end of the extension portion 122 may include a threaded hole, while the mounting bracket 106 includes a countersunk hole 128. A screw 114 may pass through the countersunk hole 128 of the mounting bracket 106 and securely thread into the extension portion 122. The extension portion 122 may then be rotated about its longitudinal axis to a preferred configuration. The extension portion 122 may be of a plurality of lengths to extend the beverage holder 100 away from the vehicle so that the beverage holder does not interfere with the proper operation of the vehicle.

In an exemplary embodiment, the beverage holder 100 includes a mounting bracket 106 configured to fit about the handlebars of a recreational vehicle. The mounting bracket 106 is adapted to fit a plurality of handle bar configurations including different diameters and contours. The mounting bracket 106 may include two sections: the front section 130 and the back section 132. The front section 130 may couple to the extension portion 122, as discussed above, while the back section 132 couples to the front section 130 to clamp onto a handlebar. The mounting bracket 106 may include an interior bore 134 generally cylindrical in shape. The interior bore 134 contacts the handle bars (not shown). The back section 132 couples to the front section with screws 114, similar to the connection of the front section 132 to the extension portion 122. The back section 132 includes counter sunk holes 128 while the front section 130 includes threaded holes (not shown). The screws are tightened into the front section 130 and a handlebar is clamped in the interior bore 134 between the front section 130 and the back section 132. The countersunk holes 128 in the back section 132 are countersunk so that the screw heads do not interfere with the operation of the beverage holder 100 or snag a user.

Figure 1B:
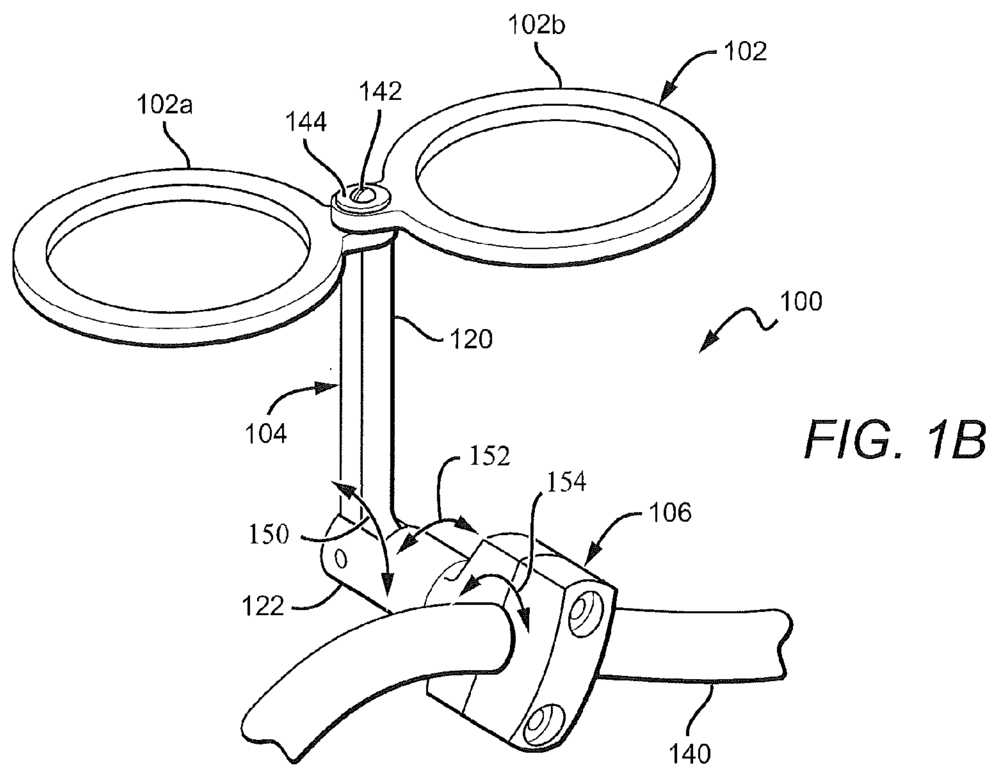
FIG. 1B illustrates an exemplary embodiment of the beverage holder described in FIG. 1A coupled to a handlebar.

FIG. 1B illustrates an exemplary embodiment of the beverage holder 100 described in FIG. 1A coupled to a handlebar 140. The beverage holder 100 may include at least one rim 102, an adjustable stem 104, and a mounting bracket 106, removably coupled to handlebars 140. In an exemplary embodiment, the beverage holder 100 includes a first rim 102*a* and a second rim 102*b* positioned generally opposite each other, so that when in use, the support beverages (not shown) would straddle the extension portion 122. The angle 150 of the arm 120 relative to the extension portion 122 is adjusted so that the at least one rim 102 is level to the ground. The extension portion 122 is adjusted to permit the arm 120 to be in a vertical position relative to the ground. The rotation, as indicated by arrow 152, of the extension portion 122 relative to the mounting bracket 106 accounts for any curvature of the handlebar 140. The mounting bracket 106 may also be rotated, as indicated by arrow 154, about the handlebar 140 to further ensure proper alignment of the system.

Figure 2A:
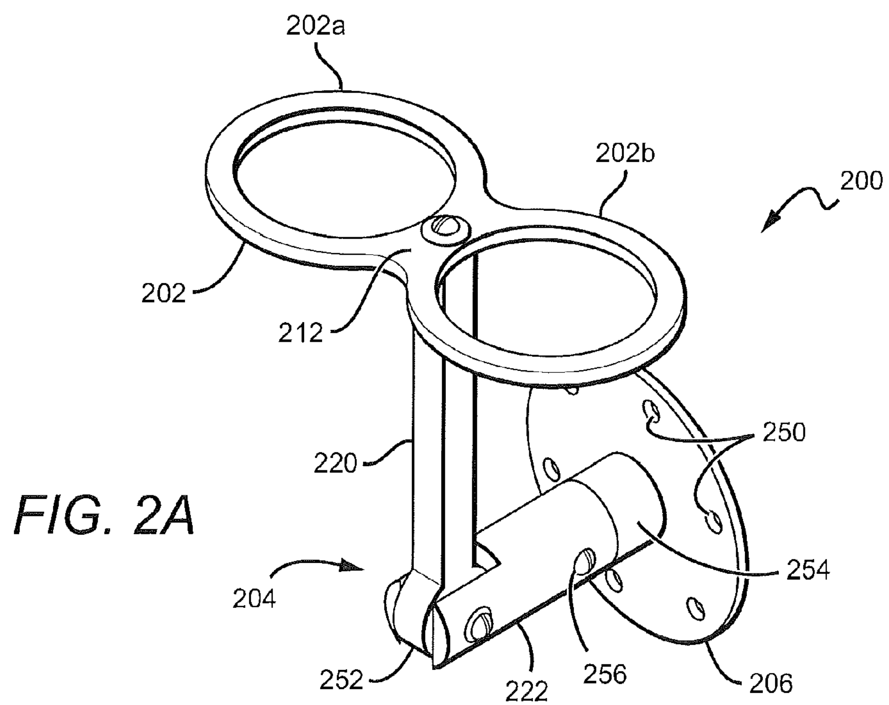
FIG. 2A illustrates an exemplary embodiment of a beverage holder including a rim, adjustable stem, and mounting bracket.

FIG. 2A illustrates an exemplary embodiment of a beverage holder 200 including a rim 202, adjustable stem 204, and mounting bracket 206. The mounting bracket 206 may be an attachment plate that may be coupled to the body of a vehicle (not shown) by screwing or bolting through the holes 250 of the mounting bracket 206. The mounting bracket 206 may be generally circular, or may be any shape to accommodate available attachment space on a given vehicle.

In an exemplary embodiment, the rim 202 includes at least one section to support a beverage container. The rim 202 of FIG. 2A is similar to the at least one rim 102 of FIG. 1A except the first rim 102*a* and the second rim 102*b* are integrally formed into a single unit. The first rim 202*a* and the second rim 202*b* may be positioned at any location relative to each other. For example, the first rim 202*a* may be across the bridge 212 from the second rim 202*b*.

The adjustable stem 204 may include an arm 220 and an extension portion 222, similar to the adjustable stem 104 of FIG. 1A, but may incorporate features according to alternate embodiments of the invention. For example, the arm 220 may include a rounded head 252 at the end toward the extension portion 220. The rounded head 252 may match the rounded contour of the extension portion 222 so that there are no protrusions between the arm 220 and the extension portion 222 to cause snagging or scratching. The extension portion 222 couples to arm 220 in a similar fashion as described with respect to FIG. 1A.

In an exemplary embodiment, a hub 254 is coupled between the extension portion 222 and mounting bracket 206. The hub 254 permits the extension portion 222 to be rotated and properly aligned without removing the mounting bracket 206 from the vehicle frame. The end of the extension portion 222 towards the hub 254 may be hollow, with an inner diameter. The hub 254 includes a neck (not shown) that has an outer diameter approximately equal to or less than the inner diameter of the extension portion 222, so that the hub neck fits inside the extension portion 222. The extension portion 222 may include a threaded hole 256 that accepts a screw. When the extension portion 222 is properly aligned with respect to the hub 254 and mounting bracket 206, the screw is used to frictionally about the neck of the hub and prevent further rotation. The neck may additionally include a circumferential indention explained further below. The hub 254 may be integrally formed with the mounting bracket 206 or may be coupled, such as by screwing, gluing, adhering, bonding, or the like.

FIG. 2B illustrates and exemplary embodiment of the beverage holder 200, including a single rim 203, adjustable stem 204, and a mounting bracket 207 according to alternate embodiments of the invention. The mounting bracket 207 may be any shape to utilize available space on a particular vehicle to accommodate mounting the beverage holder 200. The mounting bracket 207 may be, for example, generally circular, generally rectangular, including square, generally triangular, or may be a free form, or some combination thereof. The mounting bracket may be generally flat or contoured, as well, to properly seat against the vehicle surface.

FIG. 3 illustrate an exemplary embodiment of the beverage holder 300 utilizing an insert to accommodate various configurations, including sizes and shapes, of different beverage containers. The insert 360 may be generally cylindrically shaped, or may be a pouch or pocket shape. The insert 360 may include a collar 362 supported by rim 302. The collar 362 may be generally circular to rest upon the rim 302. The insert 360 may be metal or plastic, and the collar 362 integrally formed with the body 363. Alternatively, the insert 360 may be fabric, or some non-rigid material. The material may then be wrapped around the collar 362 or coupled to the collar to support the insert 360 from the rim 302. The collar 362 may be metal, plastic, rubber, or a material that holds the desired shape to support the insert 360 on the rim 302. The insert 360 may be secured to the beverage holder 300 with a band 364. The band 364 may be an elastic band coupled to the insert 360 or the collar 362 and fit around the flange 312 of the rim 302. It is contemplated that the band 364 may employ other devices to secure the insert 360 to the rim 302, such as with a pre-formed hook or claw that hooks around the end of the rim 302.

As described above, with respect to other embodiments, the rim 302 may be coupled to the adjustable stem 304. The adjustable stem 304 may also include an arm 320, an extension portion 322, and a hub 354. According to an alternate embodiment, the extension portion 322 may couple to the arm 320 with a rivet 315 or other pivot bar. The relative position of the arm 320, extension portion 322, and hub 354 with respect to each other and the vehicle may then be adjusted through set screws 314. Set screws 314 create a frictional interface between the arm 320 and the extension portion 322 and between the extension portion 322 and the hub 354, preventing further rotation. The set screw 314 fits into threaded holes **314*a* of the extension portion 322 and about the arm 320 or hub 354. The set screws 314 are flush or within the threaded holes 314*a* to prevent snagging. The set screws 314 may also be the same size to require only a single tool to adjust or tighten the beverage holder 300** once it is installed.

In an exemplary embodiment, the beverage holder 300 is used without a mounting bracket. In this case, the hub 354 may be mounted directly onto the vehicle (not shown). The hub 354 may include an internal bore along its longitudinal length. The internal bore may have a diameter less than the neck of the hub 354 within the extension portion 322. The extension portion 322 internal bore may be greater than the length of the neck portion of the hub to accommodate a head of a screw or other attachment device for the hub to the vehicle. Alternatively, the hub 354 may be bonded, adhered, glued, riveted, or coupled directly to the vehicle by some other method.

Figure 4A:
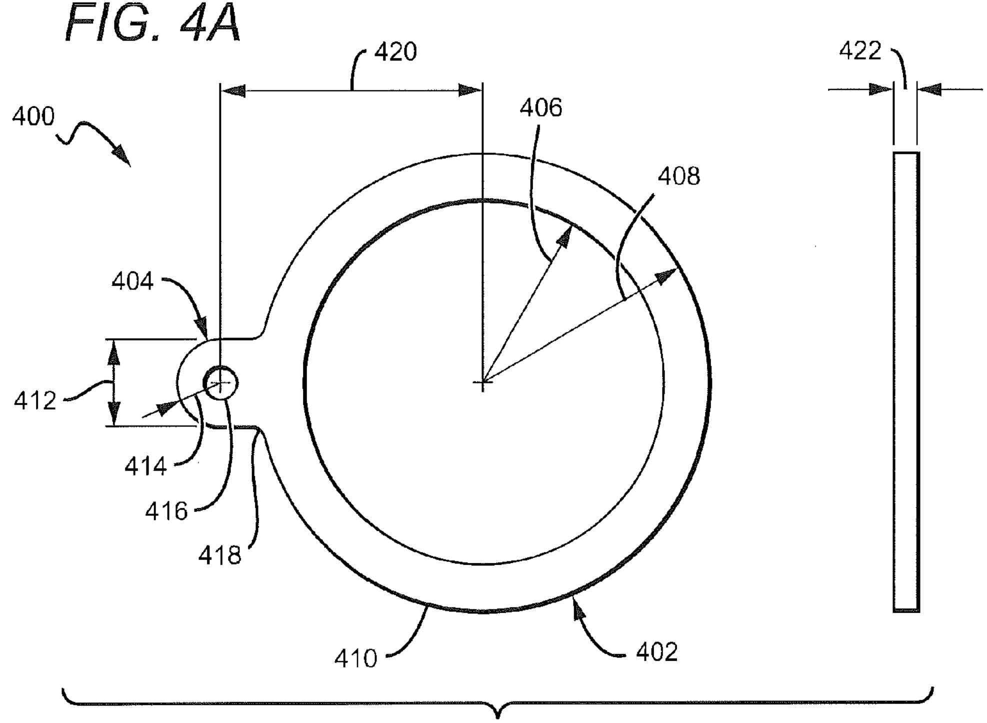
FIG. 4A illustrates an exemplary embodiment of a single rim, which may be used alone or in conjunction with other exemplary embodiments of the present invention.

FIG. 4A illustrates an exemplary embodiment of a single rim 400, which may be used alone or in conjunction with other described embodiments. The single rim 400 may include a beverage container support section 402 and a flange 414. The beverage container support 402 is a rim that support a profile change of a beverage container or the insert discussed previously. The beverage container support section 402 may be generally circular shaped with a generally concentric cut out, creating an inner radius 406 and outer radius 408. Coupled or integrally form onto an outer edge 410 of the beverage container support 402 may be the flange 404. The flange 404 may be generally circular or may be rectangular to fit an end profile of the adjustable arm (see FIG. 5) coupled to the rim.

In an exemplary embodiment, the outer radius 408 of the beverage container support section 402 is approximately 1.5 to 2.0 inches, but is preferably about 1.75 inches to 1.80 inches. The inner radius 406 of the beverage container support section 402 is approximately 1.25 to 1.5 inches, and is preferably about 1.40 inches to 1.46 inches. The flange may have a width 412 of approximately 0.6 to 1.3 inches, and a general radius of approximately 0.30 to 0.65 inches. The flange may include a hole 416 at its general center to accommodate the screw or attachment device between the rim 400 and the adjustable stem (not shown). The transition 418 between the flange 404 and the beverage container support 402 may be smooth, with a radius of about 0.125 inches. The distance 420 between the general center of the beverage container support 402 and the general center of flange 404 may be approximately 2.12 to 2.25 inches. The height 422 of the rim 400 may be about 0.1875 inches.

Figure 4B:
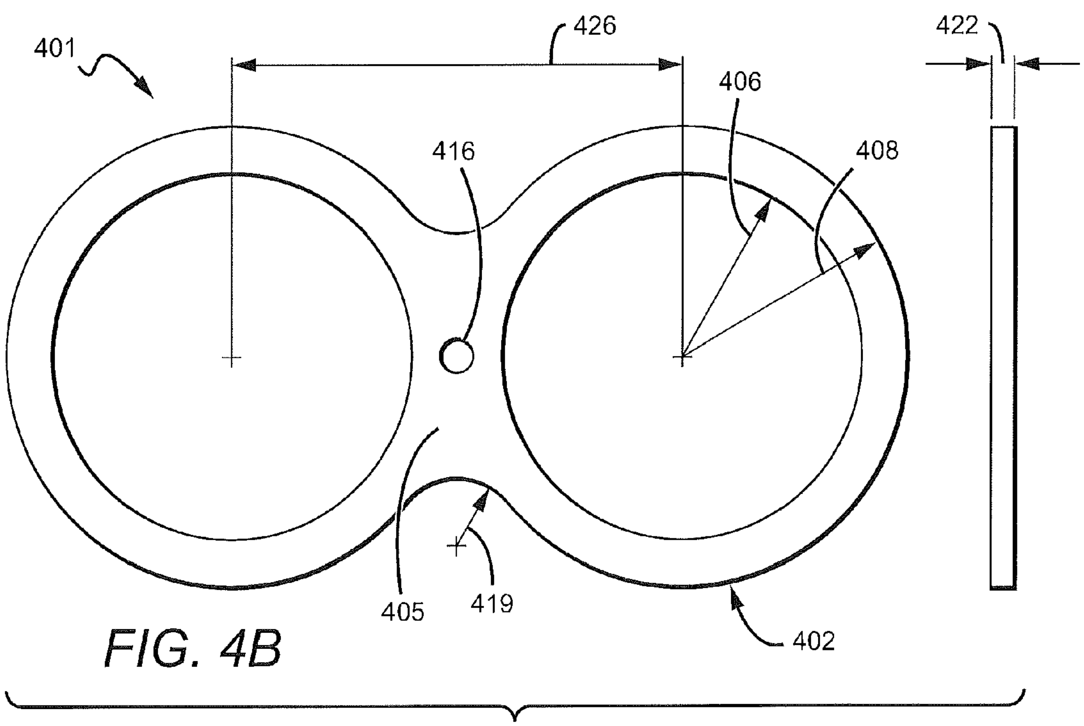
FIG. 4B illustrates an alternate exemplary embodiment of a double rim that may be used alone or in conjunction with other exemplary embodiments of the present invention.

FIG. 4B illustrates an alternate exemplary embodiment of a double rim 401. The double rim 401 is similar to the single rim 400, as described in FIG. 4A, except two or more beverage container support 402 sections are coupled or integrally formed together through a bridge 405. The bridge 405 may include a smooth transition between the plurality of beverage container support sections 402. For example, the transition may have a curvature 419 of approximately 0.25 to 0.65 inches. For the configuration where the beverage container support sections 402 are directly across the bridge 405, their respective center distances 426 may be approximately 3.5 to 4.1 inches.

Figure 5:
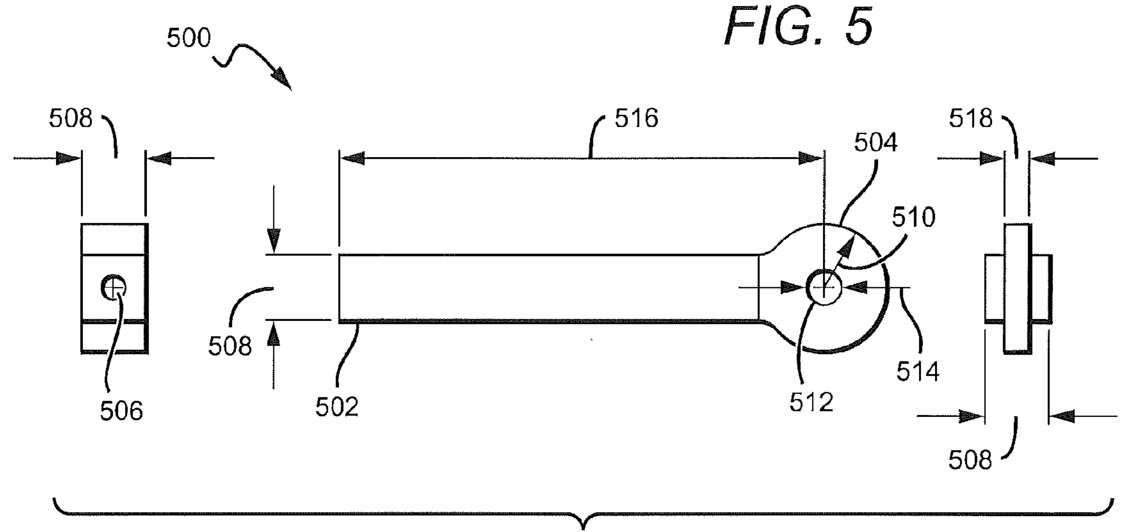
FIG. 5 illustrates an exemplary embodiment of the arm of the adjustable stem that may be used in conjunction with other embodiments of the present invention.

FIG. 5 illustrates an exemplary embodiment of the arm 500 of the adjustable stem that may be used in conjunction with various embodiments of the present invention. The arm 500 has a first end 502 configured to be coupled to the rim (not shown), and a second end 504 configured to be coupled to the extension portion (not shown), mounting bracket (not shown), or hub (not shown). The first end 502 may include a threaded hole 506 to secure the adjustable stem to the rim (not shown). The first end 502 may be a relatively constant cross section that may be rectangular, including square, or generally circular. In an exemplary embodiment, the first end 502 is generally square with an edge 508 approximately 0.25 to 0.5 inches. The second end 504 may be generally rounded, or may be contoured to correspond to the extension portion (not shown) to reduce snagging or minimize sharp edges. The radius 510 of the rounded second end 504 may be approximately 0.25 to 0.5 inches. At the approximate center of the second end 504 may be a hole 512 to accommodate the pivot connection to the extension portion (not shown). The diameter 514 of the hole 512 is about 0.12 to 0.255 inches. The length 516 of the arm 500 may be various lengths to position the rim of the beverage holder at a desired height. Preferably, the length 516 is between approximately 1.0 and 5.0 inches, and may come in a variety of lengths. In one embodiment, the second end 504 has a reduced width 518 with respect to the width 508 of the first end 502. The reduced width 518 may be approximately 0.25 inches.

Figure 6:
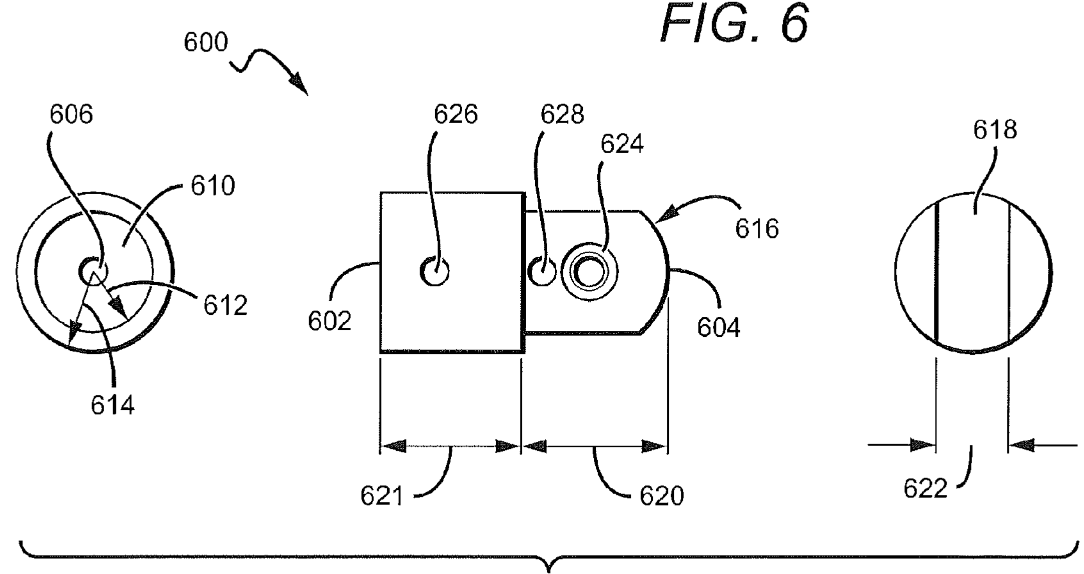
FIG. 6 illustrates an exemplary extension portion that may be utilized with the arm of FIG. 5 or other exemplary embodiments of the present invention.

FIG. 6 illustrates an exemplary extension portion 600 that may be utilized with the arm 500 of FIG. 5 or other exemplary embodiments as described herein. The extension portion 600 has a first end 602, configured to couple to a mounting bracket (not shown) or directly to a vehicle (not shown), and a second end, configured to couple to arm, such as exemplary embodiment of FIG. 5. In an exemplary embodiment, the first end 602 may include a center threaded hole to couple the extension portion 600 to a mounting bracket or vehicle body, as illustrated in FIG. 1. The threaded hole 606 may be, for example, approximately ¼ inch—20 thread. In an alternate exemplary embodiment, the first end 602 of the extension portion 600 may include a bore 610 to accommodate a neck of the hub (not shown). As an example, the inner radius 612 of the bore 610 may be approximately 0.25 to 0.0.4 inches, approximately 0.2 to 0.8 inches deep, while the outer radius 614 may be approximately 0.35 to 0.5 inches. Both features, the threaded hole 606 and center bore 610 may both be present to provide the user with configuration and mounting options within one set up. The length 621 of the first end 602 may depend on the vehicle, and may come in a variety of lengths. The extension portion 600 may be used to separate the beverage container from surfaces or parts of the vehicle to reduce interference with operating the vehicle. Therefore, as an example, the length 621 of the extension portion may be approximately 0.5 to 1.0 inches to provide a separation distance from the vehicle panels or handlebars.

In an exemplary embodiment, the second end 604 of the extension portion 600 may include at least one projection 616 to couple to arm (not shown). The projection 616 may be formed by removing a center section 618 from the second end 604 to a desired depth 620. For example, the depth 620 may be approximately 0.5 to 1.1 inches, while the width 622 of the center section 618 may be approximately 0.25 to 0.55 inches. In an exemplary embodiment, the projection 616 may include a counterbore hole 624 to accommodate a screw, pivot arm, or coupling device between the extension portion 600 and the arm (not shown). For example, The extension portion 600 may include two projections 616 (one behind the other), where the first projection includes the counter bore 624 to accommodate a screw head, while the second projection includes a threaded hole for the screw threads. The screw (not shown) then slides through the counter bore 624, the hole of the arm (not shown) and threads into the second projection, thereby clamping the arm between the first and second projections. For example, the first projection may include a countersunk bore 624 approximately 0.25 to 0.5 inches from the second end 604, and approximately 0.125 to 0.255 inch diameter with an approximately 0.2 to 0.4 inch diameter counter bore about 0.125 inches deep. The opposite projection 624 may then be a threaded hole, for example about ¼ inch with 20 thread through the bottom wall.

In an exemplary embodiment, the extension portion 600 may include one or more set screws, 626 or 628, to secure the relative location of the extension portion with respect to the hub (not shown, see FIG. 7), and/or with respect to the arm (not shown, see FIG. 5). The holes 626 or 628 or the set screws may be through only one wall of the extension portion, or may be through both walls to provide a location on both sides of the extension portion. Therefore, if one side of the extension portion abuts the vehicle or is inaccessible for a tightening tool, the other screw location may be used on the opposite side of the body. The set screw holes 626 or 628 may be, for example, about a ¼ inch—20 thread through one or both walls of the extension portion 600.

FIG. 7 illustrates an exemplary embodiment of a mounting bracket 700 configured to couple to a handlebar, including an integrally formed hub 702. The mounting bracket 700 includes a front section 704, see FIG. 7A, and a back section 706, see FIG. 7B. The front section 704 and back section 706 mate to encompass a handlebar to securely and removably couple the beverage holder (according to various embodiments described herein) to a vehicle (not shown).

As seen in an exemplary embodiment of FIG. 7A, the front section 704 may include a first end 710 that is closest to a handlebar, and a second end 712 coupled to a hub 702, either integrally or mechanically, or to the adjustable stem (not shown). The first end 710 of the front section 704 and the first end 714 of the back section 706 may include a generally semi-circular bore 712*a* and 712*b*, configured to encompass a handlebar. The semi-circular bore 712*a* and 712*b* may be a half circular cut away section from the mounting bracket that results in a cylindrical cut out from the mounting bracket. For example, the cut out radius may be about 0.5 inches. The center of the bore 712*a* or 712*b* to the edge of the mounting bracket, length 718, may be approximately 1.0 inches. The depth of the bracket 727 along an edge may be approximately 0.4 to 0.7 inches, and may be curved around the circular bore 712*b* to accommodate the radius of the cut out.

In an exemplary embodiment, the front section 704 and back section 706 may include holes 720*a* and *b*, offset from the semi-circular bore 712*a* and *b*. The back section 706 may include countersunk holes 720*b* to accommodate a screw, while the front section 704 may include threaded holes 720*a*. For example, the front section holes 720*a* may be drilled and tapped at ¼ inch—20 thread by 0.4 inches deep to 5/16 inch—18 thread to 0.5 inches deep. The countersunk holes 720*b* of the back section 706 may be approximately 0.2 to 0.4 inch with counterbore of 0.4 to 0.6 inches that is about 0.4 to 0.5 inches deep. The distance between holes 720*a* may be approximately 1.4 to 1.6 inches, while the width of the mounting bracket 724 may be approximately 0.75 to 1.0 inches.

In an exemplary embodiment, the front section 704 of mounting bracket 700 may include an integrally formed hub 702. The hub 702 may be coupled to the second end 712 of front section 704 and may include a generally cylindrical neck 730 with a cut out circumferential indention 732. The generally cylindrical neck 730 may be configured to fit inside the bore of the extension portion (see FIG. 6). The circumferential indention 732 may be configured to engage the set screw to further prevent longitudinal motion between the extension portion (not shown) and the hub. The front section may include a shoulder 734 that abuts the extension portion to properly align with the hub circumferential indention 732. In an exemplary embodiment, the shoulder width 736 may be about 0.75 to 1.0 inches, the cylindrical neck 738 may be approximately 0.5 to 0.75 inches, while the circumferential indention 740 may be approximately 0.375 to 0.55 inches. The indented portion may also start 742 approximately 0.1 to 0.25 inches away from the shoulder 712 and may be approximately 0.1 to 0.25 inches long; while the end of the necked portion 746 may be another 0.05 to 0.25 inches long.

A further exemplary embodiment contemplates that the apparatus may be constructed of a suitable material such as plastic. In another exemplary embodiment, it is contemplated that the apparatus may be constructed of any suitable material such as metal, alloy and the like, such as aluminum. Further, a contemplated embodiment of the apparatus may be constructed of a suitable material such as rubber, foam, composite, plastic and the like whereby the device may be rigid enough to support the weight of multiple full beverage containers thereon.

A further exemplary embodiment contemplates that the screws used to couple the various features of the beverage holder together may also be substituted for other coupling devices. As seen in FIG. 1A, the screws 114 may be a hex screw, while in FIG. 1B, the screw may be a rounded, flat head screw 142 utilizing a washer 144. Other screw devices such as a Hex, Allen, slot, Torx, star or Phillips key or driver screws may be utilized; but alternatively other coupling devices, such as rivet, tack, pull knob, fitted push button, quick release cam fastener, or the like, may also be used.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed:

1. An apparatus for use on a recreational vehicle, the apparatus comprising:

at least one rim having a generally cylindrical shape to accommodate a beverage container;

an adjustable stem connected to the at least one rim;

a mounting bracket coupled to the adjustable stem and adapted to fit about a handlebar of the recreational vehicle; and three independently lockable axis of rotation to position the at least one rim relative to the mounting bracket, including an arm portion of the adjustable stem coupled to the at least one rim to permit a first independently lockable axis of rotation parallel to a longitudinal axis of the arm, an extension portion of the adjustable stem pivotally coupled to the arm portion to permit a second independently lockable axis of rotation perpendicular to the longitudinal axis of the arm portion and rotationally coupled to the mounting bracket to permit a third independently lockable axis of rotation about a longitudinal axis of the extension portion.

2. The apparatus described in claim 1, wherein said at least one rim being able to accommodate a plurality of different beverage containers.

3. The apparatus described in claim 1, wherein said at least one rim being able to accommodate different sized and shaped beverage containers.

4. The apparatus described in claim 1, wherein the mounting bracket is adapted to fit a plurality of different diameter handlebars.

5. The apparatus described in claim 1, wherein the adjustable stem may allow for rotation and angling of the at least one rim.

6. The apparatus described in claim 1 wherein a plurality of rims are provided to support a plurality of beverage containers.

7. The apparatus described in claim 1 further comprising:

the at least one rim having a beverage container support portion and a flange.

8. The apparatus described in claim 1 wherein said at least one rim is rotatable about the longitudinal axis of the adjustable stem.

9. The apparatus described in claim 1 further comprising:

an extension portion of the adjustable stem that couples to the mounting bracket and further wherein the extension portion has a clamp section which couples to an arm portion of the adjustable stem.

10. The apparatus described in claim 1 further comprising:

an extension portion of the adjustable stem whereby the extension portion allows for extension of the adjustable stem from the mounting bracket thereby further removing the rim and the accompanying beverage container away from the mounting bracket and handlebar.

11. The apparatus described in claim 1 further comprising:

a second rim connected to the adjustable stem, wherein the at least one rim and the second rim are independently positionable about the adjustable stem.

12. An apparatus for use on a recreational vehicle, the apparatus comprising:

at least one rim having a generally cylindrical shape to accommodate a beverage container;

an adjustable stem connected to the at least one rim, wherein the at least one rim is fully rotatable circumferentially around the adjustable stem when a longitudinal axis of the at least one rim is parallel to a longitudinal axis of the adjustable stem;

a mounting bracket coupled to the adjustable stem and adapted to fit about a handlebar of the recreational vehicle; and three independently lockable axis of rotation to position the at least one rim relative to the mounting bracket.

* * * * *